United States Patent [19]

Larsen

[11] Patent Number: 4,992,285
[45] Date of Patent: Feb. 12, 1991

[54] PROCESS FOR LAYERING SHEETS OF FOOD MATERIAL

[75] Inventor: Hans K. Larsen, Aestorp, Sweden

[73] Assignee: Nestec S.A., Vevey, Switzerland

[21] Appl. No.: 439,474

[22] Filed: Nov. 21, 1989

Related U.S. Application Data

[62] Division of Ser. No. 282,123, Dec. 9, 1988, Pat. No. 4,899,650.

[30] Foreign Application Priority Data

Jan. 8, 1988 [PE]  Peru .................................. 88100143

[51] Int. Cl.⁵ .......................... A21C 3/08; A21C 9/08; A23L 1/16
[52] U.S. Cl. ................................... 426/297; 426/275; 426/502; 426/517
[58] Field of Search .............. 426/297, 275, 496, 502, 426/516, 517, 144, 557; 425/133.1, 462; 156/324

[56] References Cited

U.S. PATENT DOCUMENTS

| | | | |
|---|---|---|---|
| 1,975,326 | 5/1932 | Loose et al. .................. | 426/275 |
| 3,793,938 | 2/1974 | Haas . | |
| 3,804,637 | 4/1974 | Rejsa . | |
| 4,244,974 | 1/1981 | Minami et al. .............. | 426/275 |
| 4,418,085 | 11/1983 | Becquelet .................... | 426/302 |
| 4,569,849 | 2/1986 | Codino ........................ | 426/517 |
| 4,679,496 | 7/1987 | Simelunas et al. . | |
| 4,697,507 | 10/1987 | Nagasaki . | |
| 4,698,000 | 10/1987 | Thulin et al. . | |
| 4,711,165 | 12/1987 | Codino . | |
| 4,778,685 | 10/1988 | Simelunas et al. ......... | 426/502 |

Primary Examiner—Donald E. Czaja
Assistant Examiner—D. Workman
Attorney, Agent, or Firm—Vogt & O'Donnell

[57] ABSTRACT

Layered sheets of food material are prepared by advancing a plurality of sheets of flexible food material on a moving conveyor belt beneath at least one substantially stationary spiral guide, each of which is positioned above the conveyor belt and plurality of sheets and each of which has a longitudinal axis substantially horizontal and at an oblique angle to the downstream direction of movement of the advancing belt and sheets. At least one of the advancing sheets is passed at least one complete turn about a spiral guide for guiding each sheet passed around each such spiral guide so that each guided sheet comes to lie above another sheet advancing on the conveyor belt to form layered sheets of food material.

9 Claims, 5 Drawing Sheets

PROCESS FOR LAYERING SHEETS OF FOOD MATERIAL

This application is a division of application Ser. No. 282,123, filed Dec. 9, 1988, now U.S. Pat. No. 4,899,650.

BACKGROUND OF THE INVENTION

The present invention relates to a machine and method for layering sheets of food material more particularly to forming sheets of lasagne in layers, inserting a filling between the layers and cutting into portions automatically.

Normally, in the production of lasagne, the pasta is extruded, cut into sheets of a suitable width, blanched, cut and put piece by piece into an ALUTRAY device by hand with a filling of sauce between the pieces. This process has the following disadvantages:

(1) The pasta processing line is unduly long and occupies a great deal of space.

(2) The process is labour intensive and requires at least five people on the line.

(3) There are losses of pasta as a result of a lack of time for the operator to transport all the pieces of pasta to the ALUTRAY device.

(4) There are several moving parts in the machine for transporting and layering the pasta sheets, which are prone to break down or wear out.

SUMMARY OF THE INVENTION

A machine and method have been developed wherein the machine occupies less than half the length of a conventional machine, is labour saving, has no moving parts except for the basic conveyor which reduces or eliminates the costs for exchange of machine parts and possible shut-downs, and substantially prevents any losses in pasta.

Accordingly, the present invention provides a machine for layering sheets of food material comprising a conveyor belt adapted to convey a plurality of thin sheets of flexible food material lying flat and parallel to one another, power means connected to the conveyor to advance the sheets of food material downstream and at least one substantially stationary spiral guide positioned above the conveyor belt with its longitudinal axis substantially horizontal and at an oblique angle to the direction of flow of the food material, adapted to enable a respective sheet of flexible food material to pass beneath it and then to be guided at least one complete turn around it so that the said sheet comes to lie above another sheet advancing downstream.

The present invention also provides a method of layering sheets of food material characterized in that a plurality of thin sheets of flexible food material lying flat and parallel to one another advance on a conveyor belt, at least one of the sheets passes beneath and one complete turn around a respective substantially stationary spiral guide positioned above the conveyor belt with its longitudinal axis substantially horizontal and at an oblique angle to the direction of flow of the food material so that one sheet comes to lie above another sheet advancing downstream.

Advantageously, the sheet which will form the bottom sheet of the layered food material, advances along the conveyor belt in contact with it without passing around a stationary spiral guide.

By "substantially stationary" we mean that the spiral guide should not rotate around its own axis but that the angle between the guide and the direction of flow of the food material may be slightly adjustable.

DETAILED DESCRIPTION OF THE INVENTION

In the present invention the conveyor conveniently travels at a speed of from 1 to 10 meters/min and preferably from 3 to 7 meters/min. The length of the spiral guide is preferably such that it extends from the original advancing position to the final advancing position of the sheet that it guides preferably in one complete turn (360°) or two complete turns (720°).

The oblique angle of the longitudinal axis of the spiral guide to the direction of flow of the food material should be greater than 0° and less than 90° and is usually within the range of from 25° to 75°, preferably from 30° to 60°.

The lower part of the spiral guide is conveniently positioned at a height above the conveyor so that it is as near as possible to the conveyor but without touching the sheet of food material that it has guided to its new position on the conveyor. The more downstream guides are therefore advantageously positioned at a greater height above the conveyor. The distance between the spiral guide and the conveyor is preferably adjustable and the ideal distance is substantially equal to the sum of the thicknesses of the sheets of food material (and fillings, if present) which are to pass beneath the respective guide.

When there is more than one spiral guide, the guides may be positioned successively along the conveyor belt each guide being adapted to guide a sheet of food material one complete turn around it, for instance, to form a layer lying above the layer guided by the immediately preceding upstream guide so that the most downstream guide guides the sheet of food material which will form the upper layer of the product.

Although the number of spiral guides may correspond to the number of sheets of food material which are transported on the conveyor belt to form the layered product, advantageously there is one less spiral guide than the number of sheets. This is because the sheet which forms the bottom sheet of the layered product may advance along the conveyor belt in contact with it without needing to be guided to a new position by a spiral guide.

Conveniently, the spiral guide is positioned on a guide means, such as a cylindrical tube whose axis is substantially horizontal. If desired, the spiral guide may consist of small guide heads interspaced in a spiral direction around the guide means. However, advantageously, the spiral guide is provided by means of a guiding list around the circumference of a cylinder forming a spiral groove with a fixed pitch enabling the sheet of food material to be guided from one position on the conveyor belt around and in contact with the groove between the guiding lists so that it comes to lie above another sheet at another position on the conveyor belt. The groove does not necessarily have to make a complete turn around the cylindrical tube but should be present at least at the take-up and release points of the sheet of food material where it may cover a distance of 30° and preferably at least 45°.

The steepness of the spiral of the guiding list depends on the lateral distance to be covered by the sheet of food material as it is guided to its new position, and on the angle of the longitudinal axis of the cylindrical tube to the direction of flow of the food material The width of the pitch should be equal or slightly wider than the width of the sheet of food material so that it is adapted to enable the sheet of food material to be guided around the groove by the guiding list in a suitable manner. With this width as a basis, the width of the pitch may vary according to the angle of the longitudinal axis of the cylindrical tube to the direction of flow of the food material and to the lateral distance to be covered by the sheet of food material as it is guided to its new position.

Preferably, the cylindrical tube is double-walled and provided with a liquid inlet in the outer wall which is provided with one or more apertures to enable a food-compatible lubricant liquid to flow through the inlet, between the walls and through the apertures onto the outer surface into the groove formed by the guiding list to build up a thin film between the groove and the sheet of food material. A suitable lubricant liquid is water or possibly a low viscous component of a sauce filling or even the sauce itself.

When a filling is desired between the layers of product, at least one nozzle is suitably positioned upstream of at least one spiral guide to feed a certain amount of filling onto each sheet, except the upper one, before another sheet is guided to lie above it. Alernatively, a sauce filling may be pressed out through the apertures of the cylindrical tube to build up a film between the groove and the sheet of food material.

Desirably, a feed conveyor, which may be vertically adjustable, is mounted downstream of the downstream guide, at a position just above where the upper layer of the food material will be guided, which is adapted to press the food material to the desired thickness and to propel it downstream.

Conveniently, a cutting means adapted to cut the layered food material into predetermined lengths is positioned above the conveyor belt at the downstream end. The cutting means may advantageously be a guillotine knife and is preferably adapted to reciprocate so that it may advance at the same speed as the layered food material during the cutting operation in order to prevent the food material stopping.

Preferably, a shuttle conveyor is positioned just beyond the downstream end of the conveyor belt, by means of which the layered food product, after being cut, is conveniently transferred from the belt to a package such as an ALUTRAY device.

The number of sheets of flexible food material lying on the conveyor belt may vary depending on how many layers are desired. For instance, in the preparation of a lasagne, from 3 to 6 sheets may be used but a larger number of sheets may be used for some products e.g., up to 11. In the production of a lasagne, for example, a filling is inserted between the layers of product by feeding the filling onto each sheet except the upper one before another sheet has been guided to lie above it. The thickness of the sheet of food material may vary, for instance from 0.5 mm to 5 mm.

The apparatus and process of the present invention are especially suitable for slippery products such as sheets of pasta which have been extruded, blanched, cut into thin sheets and then cooled in water. In order to prevent the surface of the sheets from becoming sticky as a result of drying out, the surface of the sheets should be kept moist throughout the entire process during which the product is very slippery For example, in a preferred embodiment of the present invention, the spiral guide is provided with a guiding list around the circumference of a cylindrical tube, forming a groove with a fixed pitch. The cylinder is advantageously double-walled and is provided with a liquid inlet and one or more apertures in the outer wall, and a lubricant liquid such as water flows through the inlet, between the walls, and through the apertures in the outer wall onto the outer surface of the groove to build up a thin lubricating film between the guide and the sheet of food material as it is being guided around.

The process of the present invention proceeds automatically with only one person being required at the starting up of the line to guide the sheets of food material around the respective cylindrical guides. The present invention is illustrated by way of example with reference to the following drawings.

DETAILED DESCRIPTION OF THE DRAWINGS

Figure 1:
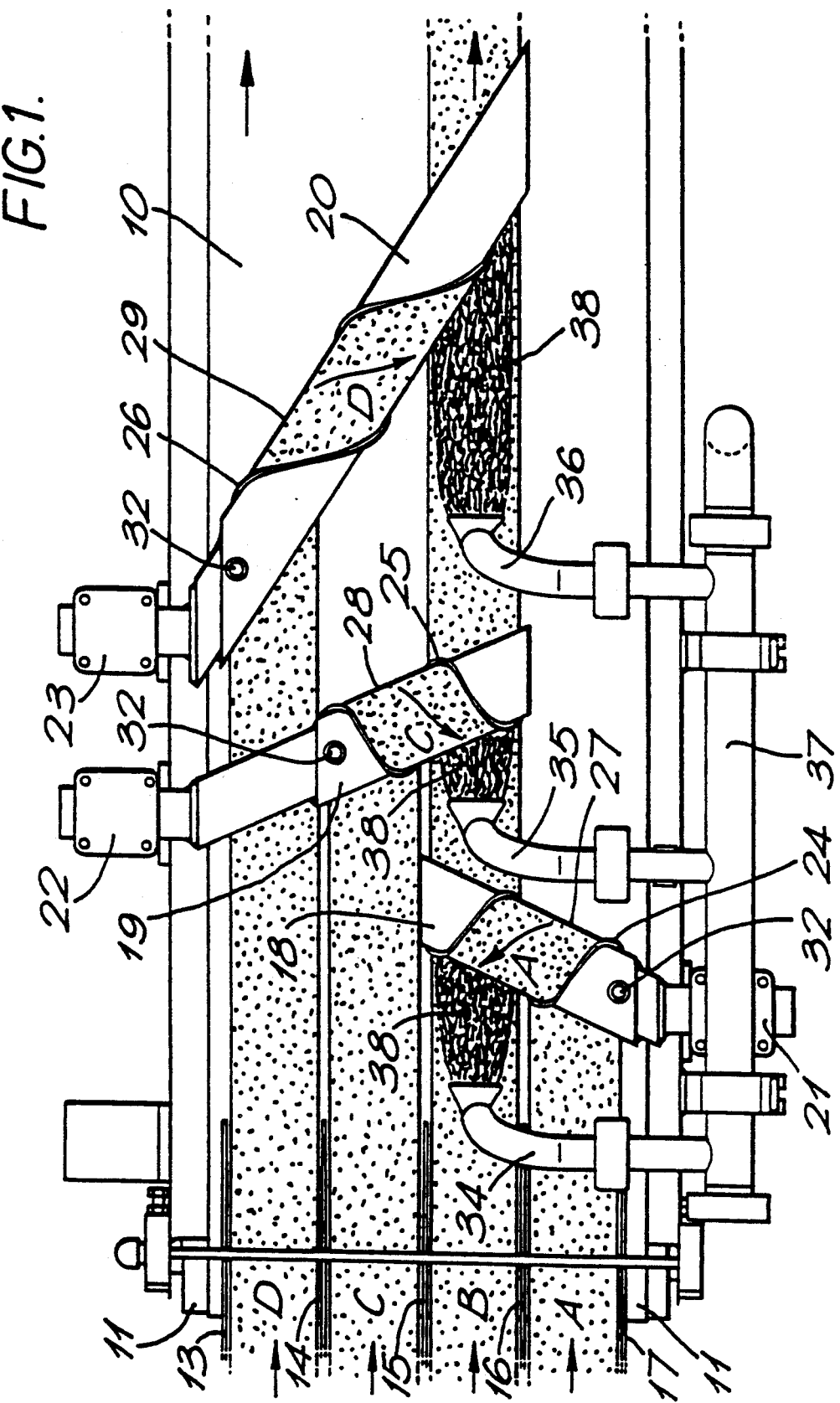
FIG. 1 represents a diagrammatic top plan view of the machine according to the invention for making a lasagne from 4 sheets of pasta.
Figure 2:
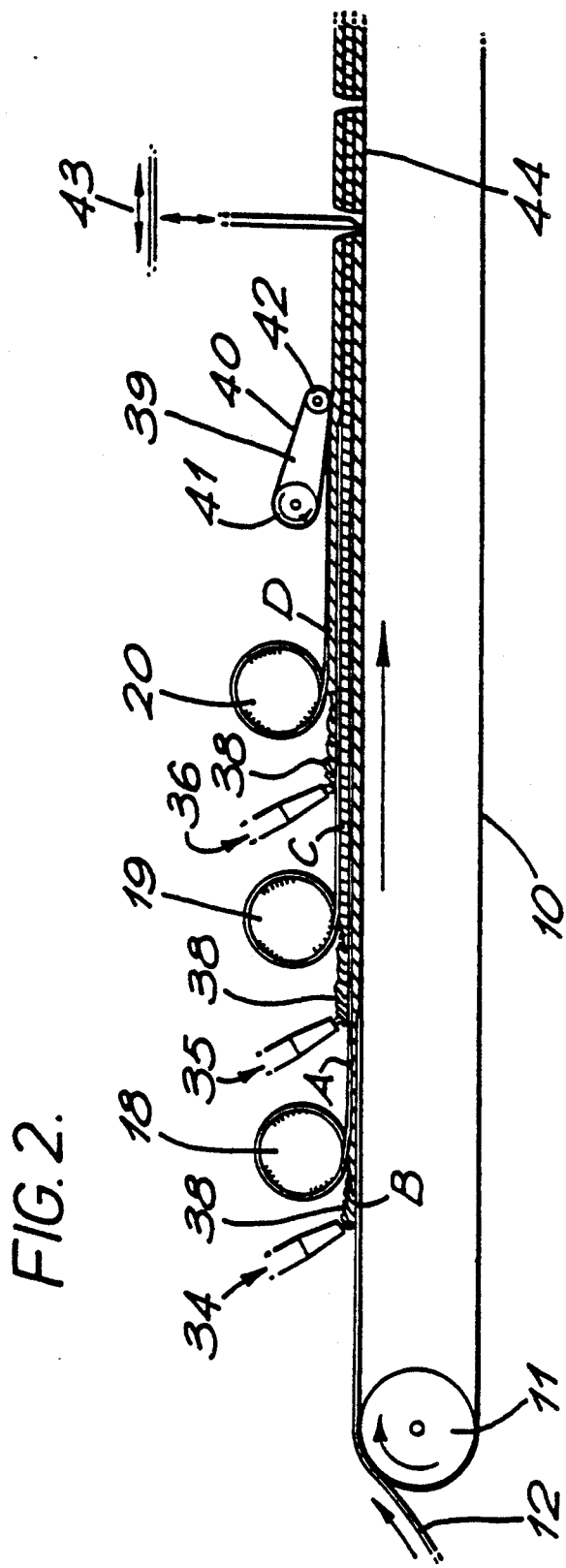
FIG. 2 represents a diagrammatic sectional side view of the machine of FIG. 1.
Figure 3:
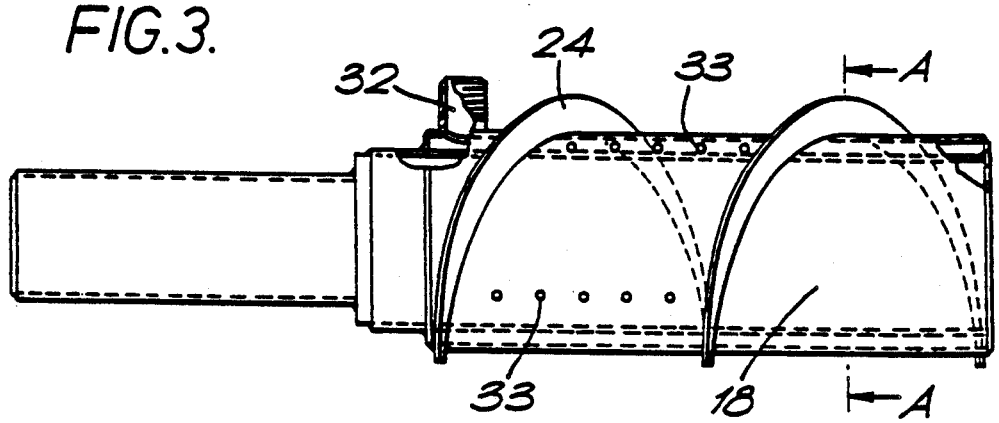
FIG. 3 is a diagrammatic side view of spiral guide 18 in FIG. 1.
Figure 4:
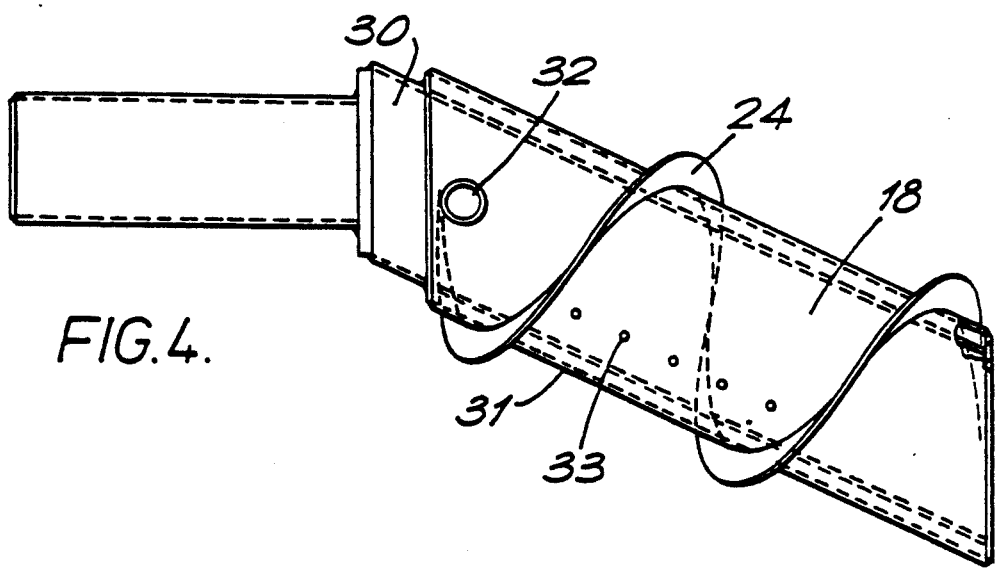
FIG. 4 is a diagrammatic top plan view of the spiral guide of FIG. 3.
Figure 5:
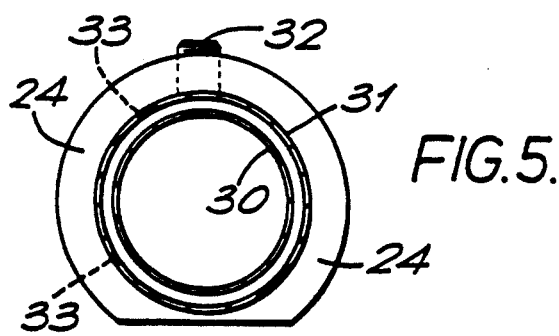
FIG. 5 is a sectional view of a spiral guide looking in the direction of the arrows A—A of FIG. 3.

Referring to FIGS. 1–5 of the drawings, the machine comprises a conveyor belt 10 driven by roller 11 in the direction indicated by the arrows. Pasta material 12 is fed onto the conveyor belt 10 in the form of four thin sheets A,B, C and D which are guided by guide plates 13,14,15,16 and 17 while travelling in the direction of the arrows. Positioned above the conveyor belt are double-walled cylindrical guide tubes 18,19 and 20 fixed to holders 21,22 and 23 respectively and provided with guiding lists 24,25 and 26 respectively forming grooves 27,28 and 29 respectively. Each cylinder has an inner wall 30, an outer wall 31 and is provided with a liquid inlet 32 and apertures 33 in the outer wall of the area of the grooves for liquid outlet. Positioned above pasta sheet B are sauce nozzles 34,35 and 36 attached to a sauce container 37 which supplies sauce 38 by means of pump (not shown). Positioned downstream of the cylindrical guide tube 20 is a vertically adjustable feed conveyor 39 comprising an endless belt 40 trained about rollers 41,42 and a reciprocating guillotine knife 43. The portioned lasagne product is indicated by numeral 44.

In operation, the four sheets of moist pasta material A,B,C and D which have been obtained by extrusion, blanching, cutting and cooling in a water basin are fed onto the conveyor belt 10 where they are transported at a speed of 5 meters/min in the direction of the arrows. Sauce 38 is continuously pumped from nozzle 34 onto sheet B. Water flows through the inlets 32 between the walls of the guide tubes 18,19 and 20 and through the apertures 33 onto the external surface of the grooves 27,28 and 29 respectively.

At the start of the process, one operator guides the pasta sheets A,C and D around the guide tubes 18,19 and 20 into the grooves 27,28 and 29 so that they come to lie in successive layers above pasta sheet B which forms the bottom sheet of the product. Once the pasta sheets have been initially guided over the guide tubes by the operator they continue to follow the guiding path aided by the water flowing through the apertures 33 forming a thin lubricating film between the external surfaces of the grooves 27,28 and 29 and the respective pasta sheets.

Pasta sheet A is quided around guiding groove 27 to lie immediately above sheet B separated by the sauce filling 38 from nozzle 34 and sauce from nozzle 35 is continuously pumped onto sheet A. Pasta sheet C is guided around groove 28 to lie immediately above sheet A separated by the sauce filling from nozzle 35 while sauce from nozzle 36 is continuously pumped onto sheet C. Pasta sheet D is guided around groove 29 to form the top sheet lying immediately above sheet C separated by the sauce filling from nozzle 36. The layered lasagne continues to advance downstream and passes beneath the feed conveyor 39 by which it is pressed to the desired thickness and by which it is urged downstream to the guillotine knife 43 where it is cut into predetermined lengths. During the cutting operation the guillotine advances at the same speed as the lasagne in order to ensure that the lasagne does not stop and after cutting the knife rises and the guillotine returns upstream to commence another cutting operation.

After being cut into portions, the lasagne is transferred to a shuttle conveyor and packed in to ALU-TRAY device.

Figure 6:
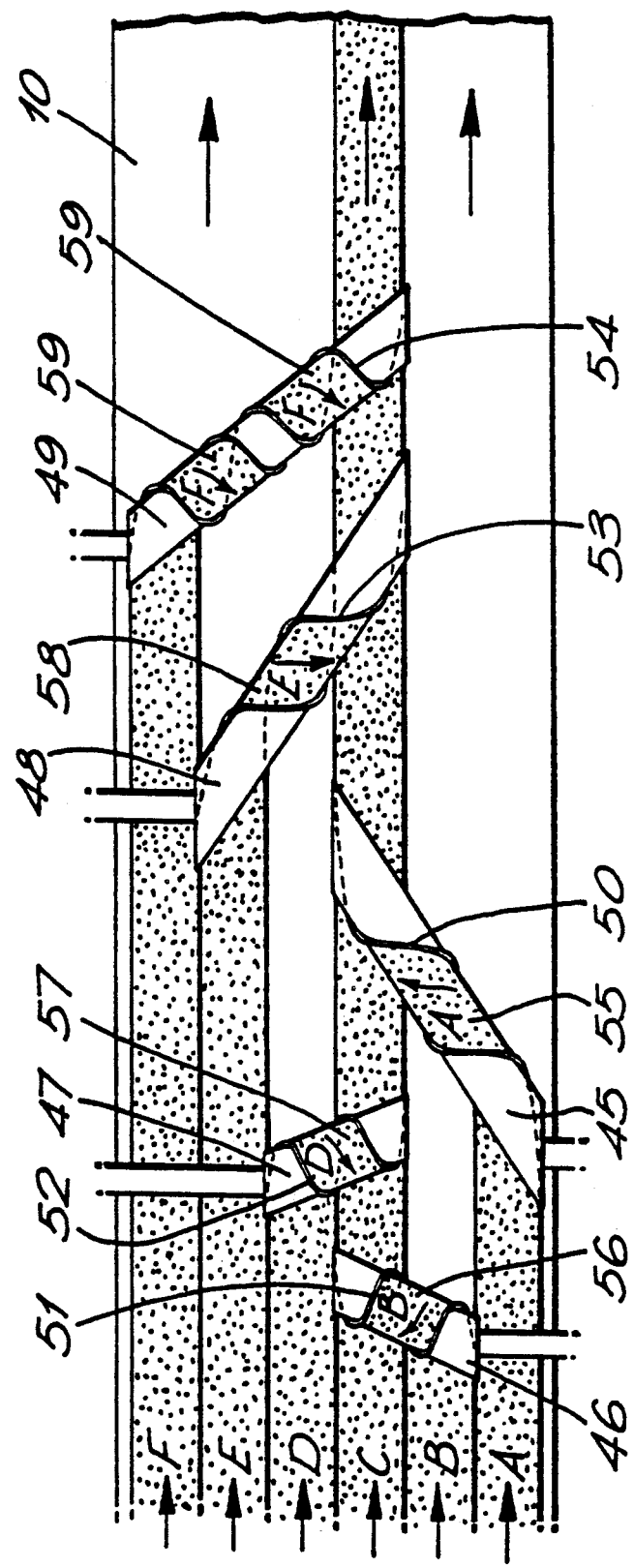
FIG. 6 is a top plan view of a machine of the present invention for making a lasagne from 6 sheets of pasta using 5 spiral guides.

Referring to FIG. 6 of the drawings, a conveyor belt 10 is driven in the direction indicated by the arrows. The pasta material is fed onto the conveyor belt in the form of six thin sheets A,B,C,D,E and F which travel at 4 meters/min in the direction of the arrows. Positioned above the conveyor belt are five double-walled cylindrical guide tubes 45,46,47,48 and 49 provided with guiding lists 50,51,52,53 and 54 respectively forming grooves 55,56,57,58 and 59 respectively.

In operation, at the start of the process one operator guides the pasta sheets B,D,A and E one complete turn around the guide tubes 46,47,45 and 48 into the grooves 56,57,55 and 58 so that they come to lie in successive layers above pasta sheet C which forms the bottom sheet of the product. The operator also guides pasta sheet F two complete turns around the groove 59 of guide tube 49 so that sheet F becomes the top layer. Once the pasta sheets have been initially guided over the guide tubes by the operator they continue to follow the guiding path aided by the water flowing through apertures in the outer walls of the cylinders as described in the embodiment of FIGS. 1 to 5. A sauce filling is supplied between the layers of pasta in a similar manner to that described in the embodiment of FIGS. 1 to 5.

Pasta sheet B is guided around groove 56 to lie immediately above sheet C, pasta sheet D is guided around groove 57 to lie immediately above sheet B, pasta sheet A is guided around groove 55 to lie immediately above sheet D, pasta sheet E is guided around groove 58 to lie immediately above pasta sheet A while pasta sheet F is guided around groove 59, two complete turns around the cylindrical guide tube to come to lie immediately above pasta sheet E and form the top layer of the lasagne. The layered lasagne continues to advance downstream as described in the embodiment of FIGS. 1 to 5.

Figure 7:
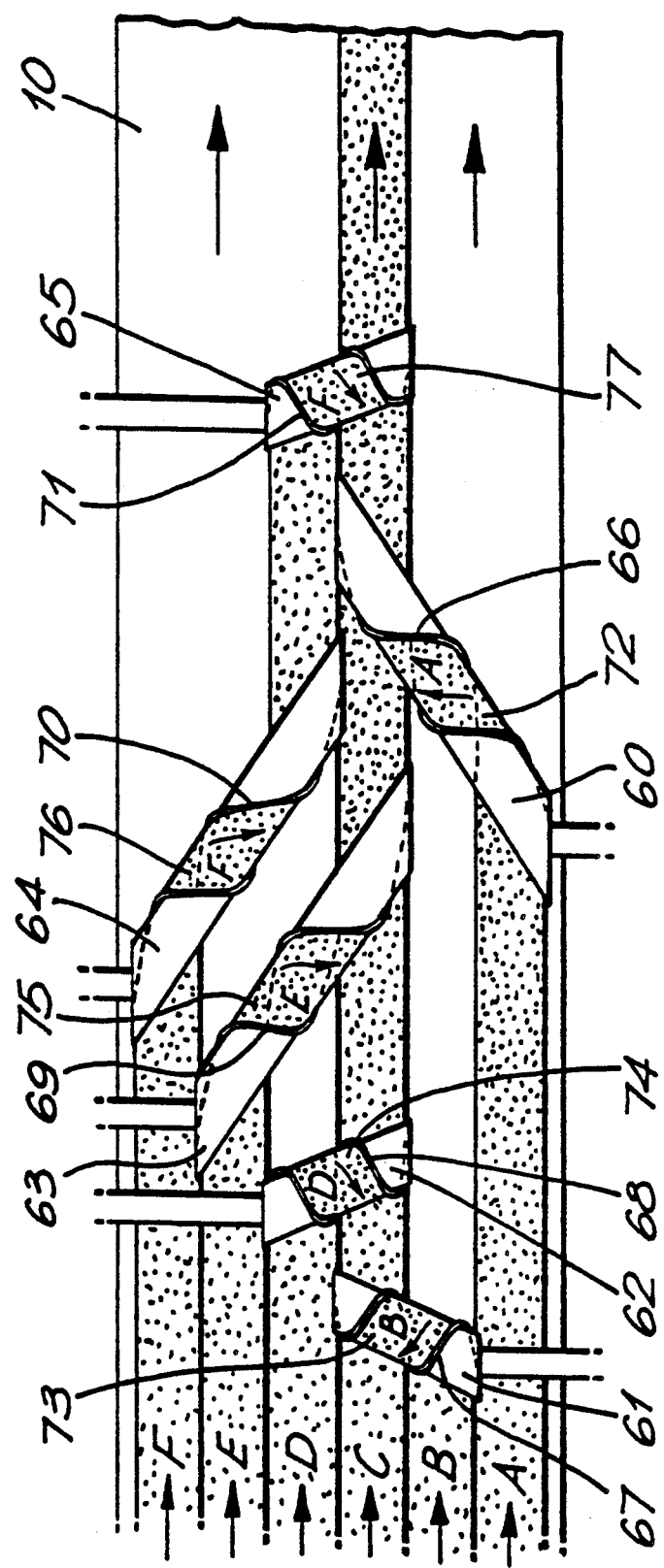
FIG. 7 is a top plan view of a machine of the present invention for making a lasagne from 6 sheets of pasta using 6 spiral guides.

Referring to FIG. 7 of the drawings, a conveyor belt 10 is driven in the direction indicated by the arrows. The pasta material is fed onto the conveyor belt in the form of six thin sheets A,B,C,D,E and F which travel at 6 meters/min in the direction of the arrows. Positioned above the conveyor belt are six double-walled cylindrical tubes 60,61,62,63,64, and 65 provided with guiding lists 66,67,68,69,70 and 71 respectively forming grooves 72,73,74,75,76 and 77 respectively.

In operation, at the start of the process one operator guides the pasta sheets B,D,E and A one complete turn around the guide tubes 61,62,63 and 60 into the grooves 73,74,75 and 72 so that they come to lie in successive layers above pasta sheet C which forms the bottom sheet of the product. The operator also guides pasta sheet F one complete turn around groove 76 of guide tube 64 and then one complete turn around groove 77 of guide tube 65 so that sheet F becomes the top layer. Once the pasta sheets have been initially guided over the guide tubes by the operator, they continue to follow the guiding path aided by the water flowing through apertures in the outer walls of the cylinders as described in the embodiment of FIGS. 1 to 5. A sauce filling is supplied between the layers of pasta in a similar manner to that described in the embodiment of FIGS. 1 to 5.

Pasta sheet B is guided around groove 73 to lie immediately above sheet C, pasta sheet D is guided around groove 74 to lie immediately above sheet B, pasta sheet E is guided around groove 75 to lie immediately above sheet D, pasta sheet A is guided around groove 72 to lie immediately above sheet E, while pasta sheet F is guided firstly around groove 76 and then around groove 77 to come to lie immediately above pasta sheet A and form the top layer of the lasagne The layered lasagne continues to advance downstream as described in the embodiment of FIGS. 1 to 5.

I claim:

1. A process for preparing layered sheets of food material comprising advancing a plurality of sheets of flexible food material lying flat and parallel to one another on a moving conveyor belt beneath at least one substantially spiral guide, each of which is positioned above the advancing conveyor belt and sheets and each of which has a longitudinal axis substantially horizontal and at an oblique angle to a direction of movement of the conveyor belt and sheets, and passing at least one of the advancing sheets at least one complete turn around one the spiral guides for guiding each sheet passed around each spiral guide to lie above another sheet of the plurality of sheets advancing on the belt to form layered sheets of food material.

2. A process according to claim 1 wherein there are a plurality of spiral guides positioned successively above the advancing conveyor belt and sheets, wherein there is one less spiral guide than there are sheets advancing on the conveyor belt and wherein each spiral guide guides one of the sheets to lie upon at least one other sheet of the plurality of sheets to form the layered sheets of food material.

3. A process according to claim 1 further comprising feed a filling onto an advancing sheet before guiding another sheet to lie above the sheet onto which the filling has been fed.

4. A process according to claim 1 wherein each spiral guide is a cylinder having a guiding list around its circumference which forms a spiral about the cylinder with a fixed pitch.

5. A process according to claim 4 wherein the cylinder is a double walled cylinder having apertures in an outer wall and further comprising flowing water between the walls of the cylinder and through the apertures for providing a lubricating film between the guide and the sheet passed around the guide.

6. A process according to claim 1 wherein the longitudinal axis of each spiral guide is at an angle of from 25° to 75° to the direction of movement of the advancing conveyor belt and sheets.

7. A process according to claim 1 wherein the conveyor belt and sheets advance at a speed of from 3 to 7 min.

8. A process according to claim 1 further comprising cutting the layered sheets of food material into predetermined lengths.

9. A process according to claim 8 further comprising transferring the cut food material from the conveyor to a package.

* * * * *

UNITED STATES PATENT AND TRADEMARK OFFICE
CERTIFICATE OF CORRECTION

PATENT NO. : 4,992,285

DATED : February 12, 1991

INVENTOR(S) : Hans K. LARSEN

It is certified that error appears in the above-identified patent and that said Letters Patent is hereby corrected as shown below:

```
     Column 6, line 62 (line 2 of claim 3) "feed" should
be --feeding--.
```

Signed and Sealed this

Fourteenth Day of July, 1992

Attest:

DOUGLAS B. COMER

Attesting Officer

Acting Commissioner of Patents and Trademarks